(12) United States Patent
Chen et al.

(10) Patent No.: US 9,338,189 B2
(45) Date of Patent: May 10, 2016

(54) INTERNET PROTOCOL MULTIMEDIA SUBSYSTEM NETWORK, AND DATA TRANSMISSION METHOD AND APPARATUS

(71) Applicant: Huawei Technologies Co., Ltd., Shenzhen, Guangdong (CN)

(72) Inventors: Aiping Chen, Hangzhou (CN); Zhanbing Zhang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 13/786,230

(22) Filed: Mar. 5, 2013

(65) Prior Publication Data

US 2013/0188644 A1    Jul. 25, 2013

Related U.S. Application Data

(63) Continuation of application No. PCT/CN2012/071722, filed on Feb. 28, 2012.

(30) Foreign Application Priority Data

Feb. 28, 2011    (CN) .......................... 2011 1 0047670

(51) Int. Cl.
*H04L 29/06*    (2006.01)
*H04L 12/46*    (2006.01)

(52) U.S. Cl.
CPC .......... *H04L 65/1016* (2013.01); *H04L 63/166* (2013.01); *H04L 65/607* (2013.01); *H04L 65/608* (2013.01); *H04L 12/4633* (2013.01)

(58) Field of Classification Search
CPC . H04L 63/166; H04L 65/1016; H04L 65/607; H04L 65/608; H04L 9/14; H04L 12/4633

USPC ................................................... 370/389, 392
See application file for complete search history.

(56) References Cited

U.S. PATENT DOCUMENTS 6,618,397 B1 *    9/2003    Huang .................... H04L 29/06
                                                       370/392
6,674,761 B1    1/2004    Bae
(Continued)

FOREIGN PATENT DOCUMENTS

CN    101388825 A    3/2009
CN    101420369 A    4/2009
(Continued)

OTHER PUBLICATIONS

T. Dierks et al., RFC 2246 : THE TLS Protocol Version 1.0, Jan. 1999, Network Working Group, pp. 49-50.*
(Continued)

*Primary Examiner* — Un C Cho
*Assistant Examiner* — Shah Rahman

(57) ABSTRACT

Embodiments of the present invention provide an Internet Protocol multimedia subsystem network, and a data transmission method and apparatus, which are used in the field of communications technologies. The data transmission method which is used in the IMS includes: performing tunnel encapsulation for an RTP packet to obtain a tunnel packet, where the tunnel packet includes a record unit, and a plurality of RTP packets are encapsulated in each record unit; and sending the tunnel packet to a peer end over a tunnel connected to the peer end. According to the embodiments of the present invention, the additional bandwidth caused by tunnel encapsulation is reduced, the bandwidth of a single packet is lowered, and the user experience and service access capabilities are improved.

9 Claims, 7 Drawing Sheets

(56) References Cited

U.S. PATENT DOCUMENTS

| | | | | |
|---|---|---|---|---|
| 2003/0193950 A1* | 10/2003 | Philips | ............... | H04L 29/06 370/392 |
| 2004/0233933 A1* | 11/2004 | Munguia | ............ | H04L 12/4633 370/473 |
| 2006/0227752 A1* | 10/2006 | Sashihara | ............ | H04W 28/06 370/338 |
| 2007/0286222 A1* | 12/2007 | Balasubramanian | ......... | 370/412 |
| 2007/0297411 A1* | 12/2007 | Zhong | ........... | 370/392 |
| 2008/0285463 A1 | 11/2008 | Oran | | |
| 2009/0213826 A1* | 8/2009 | Wang et al. | ................... | 370/338 |
| 2009/0245260 A1* | 10/2009 | Mohaban et al. | ............. | 370/392 |
| 2010/0150154 A1* | 6/2010 | Viger et al. | ................... | 370/389 |
| 2010/0281251 A1 | 11/2010 | Arauz Rosado | | |
| 2012/0110152 A1* | 5/2012 | Wing et al. | .................. | 709/223 |

FOREIGN PATENT DOCUMENTS

| | | |
|---|---|---|
| CN | 102118292 A | 7/2011 |
| EP | 1 404 058 A2 | 3/2004 |

OTHER PUBLICATIONS

Ya-Chin Sung, et al., "IPsec-Based VoIP Performance in WLAN Environments", IEEE Internet Computing, Nov./Dec. 2008, p. 77-82.

Written Opinion of the International Searching Authority dated Jun. 7, 2012 in connection with International Patent Application No. PCT/CN2012/071722.

Communication dated Aug. 26, 2013 in connection with European Patent Application No. 12 752 434.6.

L. McCarthy, "RTP Profile for Source Authentication and Non-Repudiation of Audio and Video Conference", May 1999, 17 pages.

B. Thompson, et al., "Tunneling Multiplexed Compressed RTP (TCRTP)", Nov. 2005, 24 pages.

International Search Report and Written Opinion of the International Searching Authority dated Jun. 7, 2012 in connection with International Patent Application No. PCT/CN2012/071722.

Translation of Office Action dated Nov. 5, 2012 in connection with Chinese Patent Application No. 201110047670.5.

\* cited by examiner

INTERNET PROTOCOL MULTIMEDIA SUBSYSTEM NETWORK, AND DATA TRANSMISSION METHOD AND APPARATUS

CROSS-REFERENCE TO RELATED APPLICATIONS

This application is a continuation of International Application No. PCT/CN2012/071722, filed on Feb. 28, 2012, which claims priority to Chinese Patent Application No. 201110047670.5, filed on Feb. 28, 2011, both of which are hereby incorporated by reference in their entireties.

TECHNICAL FIELD

The present invention relates to the field of communications technologies, and in particular, to an Internet Protocol multimedia subsystem network, and a data transmission method and apparatus.

BACKGROUND

An IP multimedia subsystem (Internet Protocol Multimedia Subsystem, IMS) is a brand-new multimedia service architecture, which is well recognized as a core technology in a Next Generation Network (Next Generation Network, NGN). The IMS is based on the Session Initiation Protocol (Session Initiation Protocol, SIP) protocol to support fixed access and mobile access, and based on ALL-IP to implement convergence of mobile and fixed networks. The IMS is a critical way to implement convergence of multimedia full services such as voice, data, and video services. The IMS supports diversified access terminals and access networks. A very complex access path may exist between an IMS terminal and an IMS core network. Intermediate network elements including devices, such as a Firewall (Firewall, FW), a Network Address Translation (Network Address Translation, NAT) device, an application Proxy (Proxy) Server, and a service monitoring gateway, may process and control packets (for example: SIP (Session Initiation Protocol)/RTP (Real-time Transport Protocol, Real-time Transport Protocol) packet) bearing the IMS services. This may result in that the IMS terminal cannot normally access the network or implement communication.

At present, a tunnel encapsulation based mechanism is mainly used to implement secure access of the IMS service. As shown in FIG. 1, a Security Tunnel Gateway (Security Tunnel Gateway, STG) is deployed at the entrance of the IMS core network, and a Secure Sockets Layer (SSL) tunnel client is integrated in the IMS terminal. When the IMS terminal is started, the SSL tunnel client establishes an SSL tunnel with the STG, and performs SSL tunnel encapsulation for a SIP/RTP packet according to the process illustrated in FIG. 2, and transmits the encapsulation packet (or called an SSL tunnel packet) to the STG over the SSL tunnel. After the SSL tunnel packet is sent to the STG over the network, the STG recovers the SIP/RTP packet from the SSL tunnel packet according to a process (that is, tunnel decapsulation) inverse to the process illustrated in FIG. 2, and forwards the packet to a media server. Conversely, the packet returned by the media server experiences the same process and is sent to the IMS terminal, and the IMS terminal recovers the packet. In this way, thousands of ports bearing the IMS services are uniformly aggregated to a standard Hypertext Transfer Protocol over Secure Socket Layer (HTTPS) (443) port by using SSL tunnel encapsulation, the intermediate network element devices such as the FW, the NAT, and the proxy are easily traversed, and encryption of the SIP/RTP packets is supported. In this way, functions of port aggregation, data encryption, and information integrity protection are implemented for the communication data. The SIP/RTP packets may be not only encapsulated based on the SSL tunnel, but also encapsulated based on an Hypertext Transfer Protocol (Hypertext Transfer Protocol, HTTP) tunnel or a User Datagram Protocol (User Datagram Protocol, UDP) tunnel.

Specifically, as shown in FIG. 2, the process of SSL tunnel encapsulation of the RTP packet is as follows:

Step S202: Collect and code media data (for example, voice or video data) of IMS services at a sampling period of 20 ms (namely, a sampling rate of 50 packets per second).

Step S204: Encapsulate the media data into an RTP packet by using a virtual protocol stack.

Step S206: Add a tunneling protocol header (Encapsulation Header, abbreviated to Enc Hdr in FIG. 2, which may also be abbreviated to Enc Header) in the header of the RTP packet.

Step S208: Add digest information and packet length padding information (the digest information and packet length padding information are represented by HMAC-Tail in FIG. 2), perform SSL encryption for the entire packet, and add an SSL protocol header (SSL Header, abbreviated to SSH Hdr in FIG. 2) in the header of the encrypted packet to form an SSL record (SSL record or SSL record unit).

Step S210: For transmission over the network, finally encapsulate the SSL record into a TCP (Transfer Control Protocol, Transfer Control Protocol) packet (that is, the SSL tunnel packet) and transmit the packet over the network to the STG.

During the above processing of SSL tunnel encapsulation, each RTP packet forms an SSL record, and a large amount of additional information is added to each RTP packet. This results in that the length of the finally sent SSL tunnel packet is larger than that of the RTP packet so that the bandwidth of a single packet increases sharply.

Using the case where the audio coding format of media data is G.729 as an example, the formula for calculating the length of an RTP packet is: IP (20)+UDP (8)+RTP (12)+Payload (20)=60 bytes, where IP indicates an IP header, UDP indicates a UDP header, RTP indicates an RTP header, and Payload indicates the payload (that is, media data of the IMS service). Therefore, when 50 packets are transmitted per second (that is, the packetization time of an RTP packet is 20 ms), the calculated bandwidth is 60*8*(1 s/20 ms)=24 kbit/s.

After the SSL tunnel encapsulation, the formula for calculating the length of the finally sent SSL tunnel packet is: IP (20)+TCP (20)+SSL Header (5)+Enc Header (16)+RTP packet (60)+HMAC-Tail (28)=149 bytes, where IP indicates an IP header, TCP indicates a TCP header, SSL Header indicates an SSL header, Enc Header indicates a tunneling protocol header, and HMAC-Tail indicates a combination of digest information and packet length padding information. Therefore, when 50 packets are transmitted per second, the calculated bandwidth is 149*8 (1 s/20 ms)=59.6 kbit/s.

It can be inferred that the bandwidth of a single packet increases by 35.6 kbit/s (that is, the additional bandwidth is 35.6 kbit/s), equivalent to a bandwidth increase of 148%, by comparing the packet length before and after the SSL tunnel encapsulation. With a sharp increase of the bandwidth, a higher requirement is imposed on the user access bandwidth, which degrades user experience and service access capabilities.

SUMMARY

Embodiments of the present invention provide an Internet Protocol multimedia subsystem network, and a data transmission method and apparatus, which can at least solve the problem that user experience and service access capabilities are degraded in the prior art.

In one aspect, a data transmission method is provided, which is used in an IMS, including: performing tunnel encapsulation for an RTP packet to obtain a tunnel packet, where the tunnel packet includes a record unit, and a plurality of RTP packets are encapsulated in each record unit; and sending the tunnel packet to a peer end over a tunnel connected to the peer end, where the peer end is an STG or an IMS terminal.

In another aspect, a data transmission apparatus is provided, which is used in an IMS, including: an encapsulating module, configured to perform tunnel encapsulation for an RTP packet to obtain a tunnel packet, where the tunnel packet includes a record unit, and a plurality of RTP packets are encapsulated in each record unit; and a sending module, configured to send the tunnel packet to a peer end over a tunnel connected to the peer end, where the peer end is an STG or an IMS terminal.

In still another aspect, an IMS is provided, including an IMS terminal and an STG, where the IMS terminal and the STG are data transmission apparatuses.

In the embodiments of the present invention, considering the characteristic that small packets of RTP packets may be transmitted periodically, the plurality of RTP packets are encapsulated into a record, that is, the plurality of RTP packets share additional information of one record. In this way, additional information of the plurality of RTP packets during the tunnel encapsulation process of the IMS service is aggregated by sacrificing a little real-time performance. This reduces the additional bandwidth caused by the tunnel encapsulation, further reduces the bandwidth of a single packet, and avoids the problem of the prior art that user experience and service access capabilities are degraded to some extent because higher requirements are imposed on the user access bandwidth due to the higher additional bandwidth of the single packet.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these drawings without creative efforts.

DETAILED DESCRIPTION

To make the solutions of the present invention more comprehensible for persons skilled in the art, the following clearly describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
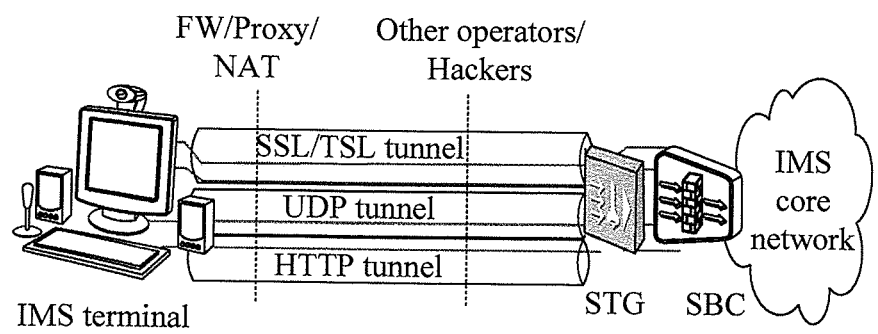
FIG. 1 is a schematic diagram of an architecture of an IMS according to the prior art.

In an IMS illustrated in FIG. 1, a tunnel, for example, an SSL tunnel, an HTTP tunnel, or a UDP tunnel, is established between an IMS terminal and an STG at the entrance of an IMS core network. Data is transmitted between the IMS terminal and the STG over the tunnel, to implement secure access and transmission of an IMS service.

Embodiment 1

Figure 3:
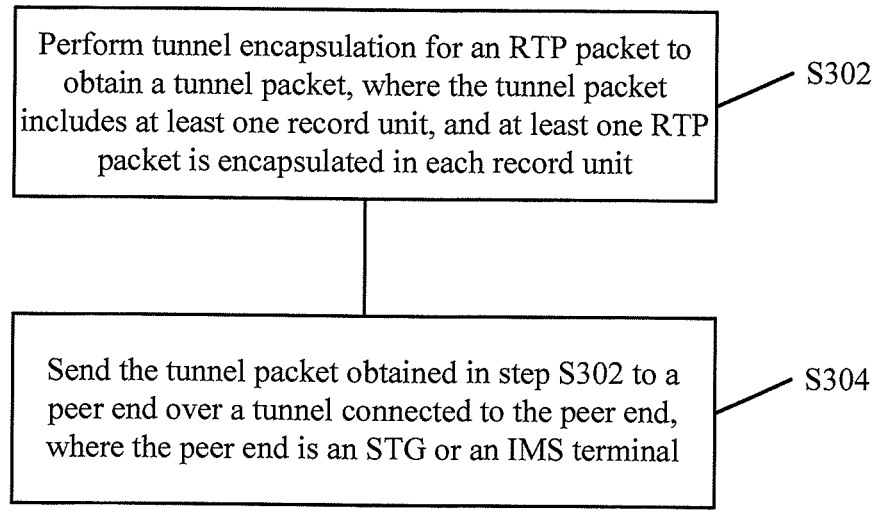
FIG. 3 is a flowchart of a data transmission method in an IMS according to a first embodiment of the present invention.

In the above IMS, a data transmission method of an IMS terminal or an STG according to a first embodiment is as illustrated in FIG. 3, including the following steps:

Step S302: Perform tunnel encapsulation for an RTP packet to obtain a tunnel packet, where the tunnel packet includes a record unit, and a plurality of RTP packets are encapsulated in each record unit.

For example, when an SSL tunnel is established between an IMS terminal and an STG, the IMS terminal or the STG performs tunnel encapsulation for the RTP packets, that is, performs SSL tunnel encapsulation for the plurality of RTP packets to form an SSL record and then encapsulates the SSL record into a tunnel packet. The process of performing SSL tunnel encapsulation for the plurality of RTP packets to form an SSL record is not detailed herein and will be described in detail in a second embodiment illustrated in FIGS. 4-5.

Step S304: Send the tunnel packet obtained in step S302 to a peer end over a tunnel connected to the peer end, where the peer end is an STG or an IMS terminal.

Obviously, when the IMS terminal performs steps S302-S304, the peer end is the STG; when the STG performs steps S302-S304, the peer end is the IMS terminal. The IMS terminal and the STG may transmit data to each other over the tunnel established between them.

In an IMS service, the major network traffic comes from the RTP packets. However, as regards the RTP packets, a large number of small packets may be transmitted periodically, with a data transmission interval of 10 ms to 100 ms. Generally, the byte length of each RTP packet does not exceed 200 bytes. In this embodiment of the present invention, considering the characteristic that small packets of RTP packets may be transmitted periodically, the plurality of RTP packets are encapsulated into a record, that is, the plurality of RTP packets share additional information of one record. In this way, additional information of the plurality of RTP packets during the tunnel encapsulation process is aggregated by sacrificing a little real-time performance. This reduces the additional bandwidth caused by the tunnel encapsulation, further reduces the bandwidth of a single packet, and avoids the problem of the prior art that user experience and service access capabilities are degraded to some extent because higher requirements are imposed on the user access bandwidth due to the higher additional bandwidth of the single packet.

In the first embodiment, the tunnel may be an SSL tunnel, or an HTTP tunnel, or a UDP tunnel.

In the above IMS, a data transmission method of an INS terminal or an STG according to an embodiment includes the following steps:

Step S312: Perform tunnel encapsulation for an RTP packet to obtain a tunnel packet, where the tunnel packet includes at least one record unit, and at least one RTP packet is encapsulated in each record unit.

Step S314: Send the tunnel packet obtained in step S312 to a peer end over a tunnel connected to the peer end, where the peer end is an STG or an IMS terminal.

In step S312, when the TCP encapsulation is performed for the SSL record, to further reduce the additional bandwidth, a plurality of SSL records may also be encapsulated into a TCP packet (that is, an SSL tunnel packet). In this way, the SSL tunnel packet finally sent may include one or a plurality of SSL records, and a plurality of RTP packets are encapsulated in each SSL record.

Embodiment 2

Figure 2:
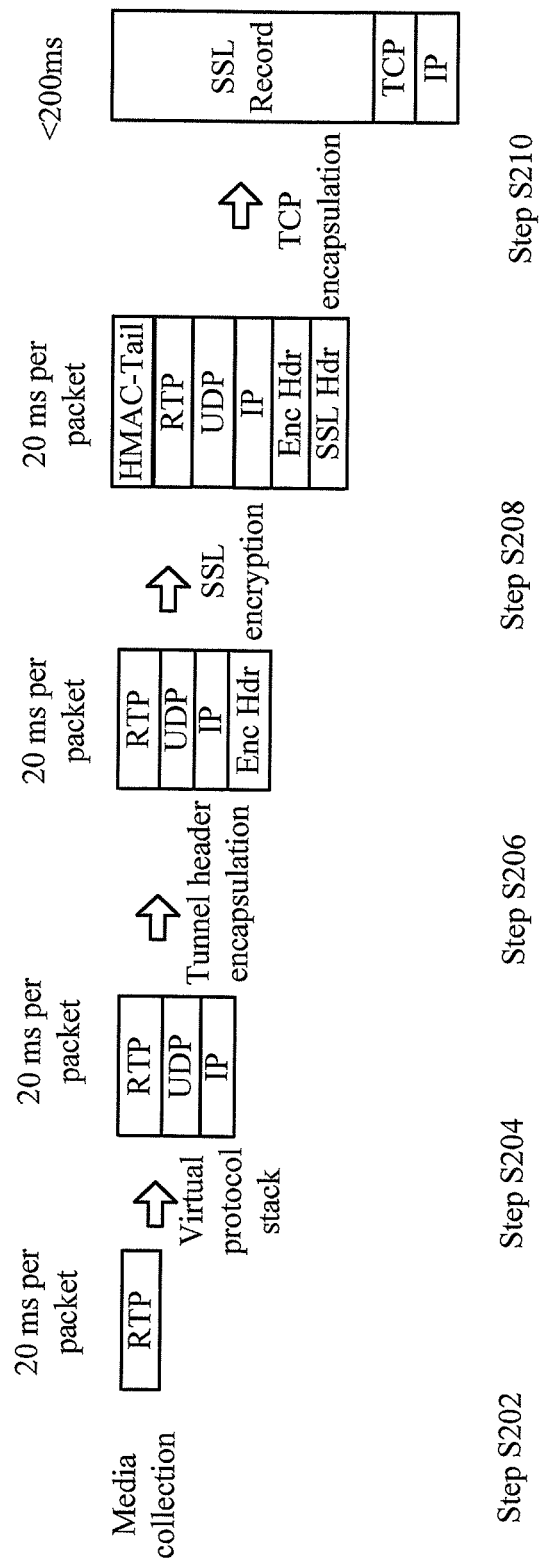
FIG. 2 is a schematic diagram of an SSL tunnel encapsulation process of an IMS service packet according to the prior art.
Figure 4:
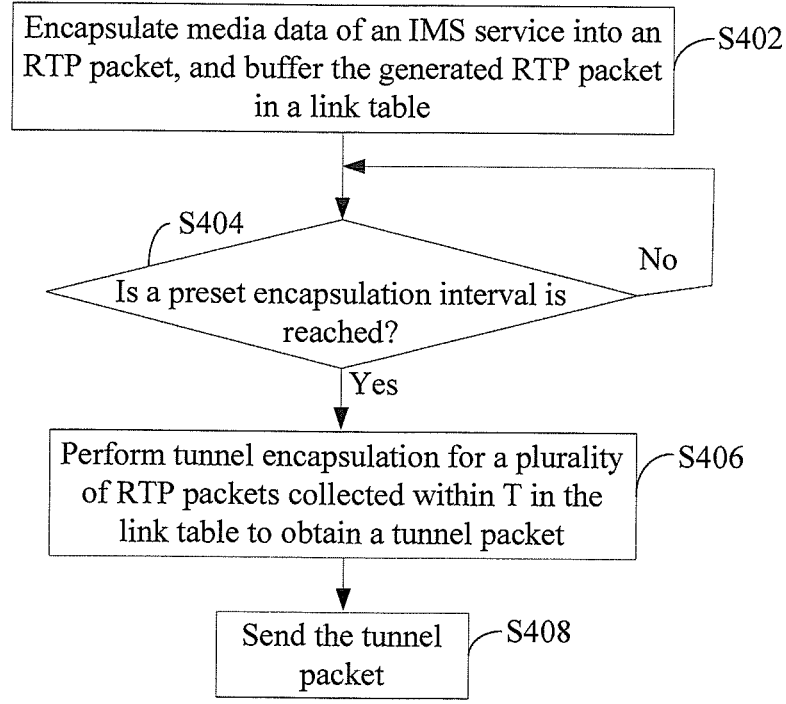
FIG. 4 is a flowchart of a data transmission method of an IMS terminal according to a second embodiment of the present invention.

The following uses sending a tunnel packet by an INS terminal to an STG as an example for description. As shown in FIG. 4, a data transmission method of an IMS terminal according to a second embodiment of the present invention includes the following steps:

Step S402: In a pre-created link table, generate (the specific generation steps are the same as steps S202-S204 in FIG. 2) and buffer an RTP packet.

For example, the link table may be an FIFO (First In First Out, first in first out) link table. An FIFO link table may be pre-created, media data of the IMS service is continuously written into the memory space where the FIFO link table is located, the media data is encapsulated into a plurality of RTP packets, and the generated (that is, obtained by encapsulation) RTP packets are buffered.

Step S404: Judge whether a preset encapsulation time interval T is reached; if so, perform step S406; otherwise, return to step S404.

For example, a timer may be set, where the period of the timer is T. To ensure quality of the IMS service, a specific value of the preset encapsulation time interval T should be within a range allowed by a voice delay, that is, T≤200 ms, for example T=100 ms.

Step S406: Perform tunnel encapsulation for the plurality of RTP packets (the number of RTP packets) collected within T in the link table so that the plurality of RTP packets forms a record; and encapsulate the record into a final tunnel packet.

Figure 5:
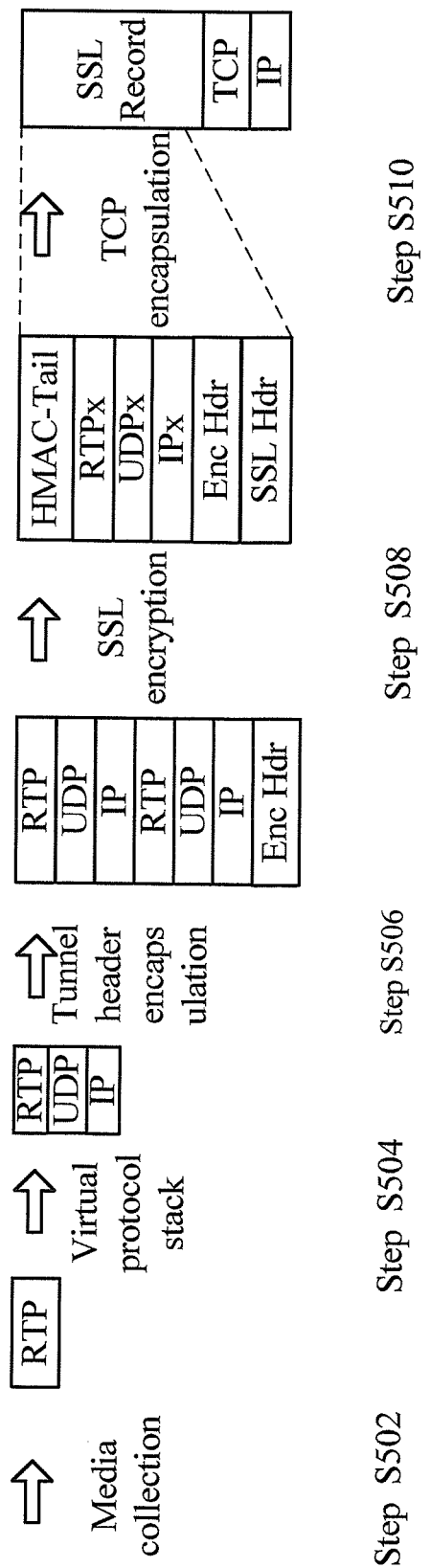
FIG. 5 is a schematic diagram of an SSL tunnel encapsulation process of an IMS service packet according to the second embodiment of the present invention.

As shown in FIG. 5, using an SSL tunnel as an example, the process of performing SSL tunnel encapsulation for the plurality of RTP packets (marked as N packets) collected within T includes the following steps:

Steps S502-S504: These steps are the same as steps S202-S204; and in the two steps, multimedia data is encapsulated into an RTP packet.

Step S506: Fetch N RTP packets (that is, the N RTP packets collected within T, where each of the N RTP packets is generated according to steps S502-S504 in FIG. 5) in the link table, copy the N RTP packets to a section of contiguous memory space, and add a tunneling protocol header (Enc Header) to the header of the section of memory space.

Step S508: Perform, by using a specific digest algorithm, digest calculation for the content (or data) in the memory space with the Enc Header added to obtain the digest information (HMAC), attach the digest information in the tail of the memory space, add packet length padding information (Tail) behind the digest information (the digest information and the packet length padding information are represented by HMAC-Tail in FIG. 5), perform SSL encryption for the entire packet, and then add an SSL header (SSL Header) in the header of the encrypted packet to form an SSL record.

After the Tail is added, the data length of the entire packet may be an integral multiple of 16 bytes, 32 bytes, 64 bytes, and 128 bytes. In an actual application, the data length is an integral multiple of 16 bytes.

Figure 6:
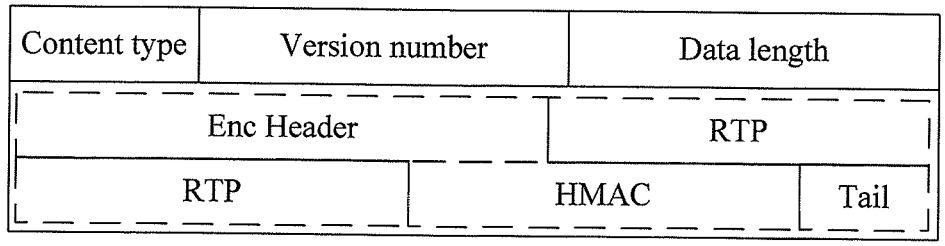
FIG. 6 is a schematic diagram of a frame structure of an SSL record according to the second embodiment of the present invention.

FIG. 6 is a schematic diagram of a frame structure of the SSL record, mainly including two parts: a header and encrypted data. The header includes the content type, the version number, and the data length, and the header is the SSL Header in FIG. 5; the encrypted data includes an Enc Header, N RTP packets (FIG. 6 only shows the case of two RTP packets), the HMAC (digest information), and the Tail (packet length padding information).

Step S510: This step is the same step S210. The SSL record is used as the content, and a TCP header and an IP header are added in the header to complete TCP encapsulation. In this step, it should be noted that when the TCP encapsulation is performed for the SSL record, to further reduce the additional bandwidth, a plurality of SSL records may also be encapsulated into a TCP packet (that is, an SSL tunnel packet). In this way, the SSL tunnel packet finally sent may include one or a plurality of SSL records, and a plurality of RTP packets are encapsulated in each SSL record.

In the above process, the RTP packets that originally need to be encapsulated into a plurality of SSL records may be encapsulated into only one SSL record.

The case where the audio coding format of media data is G.729 is also used as an example. Assume that T=100 ms, and that the packetization time of the RTP packet is 20 ms. In this case, the formula for calculating the bandwidth for the SSL tunnel packet is {IP(20)+TCP(20)+SSL Header(5)+Enc Header(16)+RTP packet ((100/20)*60)+HMAC−Tail (28)}*8*(1 s/100 ms)=389*8*10=31.12 kbit/s. Compared with the bandwidth of 24 kbit/s of the RTP packet, the additional bandwidth is 31.12−24=7.12 kbit/s.

It can be seen from the above practical data that, when the preset encapsulation time interval is T=100 ms, the bandwidth of the SSL tunnel packet according to the embodiment of the present invention is 31.12 kbit/s, which is reduced by 28.48 kbit/s as compared with the bandwidth of 59.6 kbit/s of the SSL tunnel packet in the prior art; and the additional bandwidth is also reduced from 35.6 kbit/s to 7.12 kbit/s, achieving a reduction by 5 times.

Assume that T=200 ms, and that the packetization time of the RTP packet is 20 ms. In this case, the formula for calculating the bandwidth for the SSL tunnel packet is {IP(20)+TCP(20)+SSL Header(5)+Enc Header(16)+RTP packet ((100/20)*60)+HMAC−Tail(28)}*8*(1 s/200 ms)=689*8*5=27.56 kbit/s. Compared with the bandwidth of 24 kbit/s of the RTP packet, the additional bandwidth is 27.56−24=3.56 kbit/s.

It can be seen that, when the preset encapsulation time interval is T=200 ms, the bandwidth of the SSL tunnel packet according to the embodiment of the present invention is 27.56 kbit/s, which is reduced by 32.04 kbit/s as compared with the bandwidth of 59.6 kbit/s of the SSL tunnel packet in the prior art; and the additional bandwidth is also reduced from 35.6 kbit/s to 3.56 kbit/s, achieving a reduction by 10 times.

It can be seen from the above two embodiments that: the longer the preset encapsulation time interval T, the more the additional bandwidth of the tunnel packet is reduced against the RTP packet, thereby reducing the single packet bandwidth of the tunnel packet. For a specific media coding type, according to the embodiment of the present invention, the packet sending characteristic of the tunnel packet changes as compared with the RTP packet that is not encapsulated. To be specific, the packet sending interval is prolonged by an integral multiple (the packet sending interval is T), and generally the packet length is proportionally increased. However, the additional bandwidth is proportionally reduced, and the bandwidth of the tunnel packet is notably saved. The audio coding format of the media data varies, and accordingly the length of the RTP packet changes. However, the reduction of the final additional bandwidth of the tunnel packet is not affected.

Step S408: Send the obtained tunnel packet to an STG over a tunnel connected to the STG.

After receiving the tunnel packet, the STG may perform tunnel decapsulation for the tunnel packet according to a process inverse to the process illustrated in FIG. 5 to recover a plurality of RTP packets.

Similarly, the process of sending the tunnel packet by the STG to the IMS terminal is the same as that described in steps S402-S408, which is not detailed herein. In this case, after receiving the tunnel packet sent by the STG, the IMS terminal performs tunnel decapsulation for the received tunnel packet to obtain an RTP packet, where the tunnel packet includes a record unit, and a plurality of RTP packets are encapsulated in each record unit.

In addition, when the tunnel is an HTTP tunnel, the process of performing HTTP tunnel encapsulation by the IMS terminal or the STG is similar to that illustrated in FIGS. 4-5. The only difference is that in step S508, after the packet length padding information is added, the packet is not encrypted but an HTTP protocol header (HTTP Header) is directly added in the header of the packet to form an HTTP message body. When the tunnel is a UDP tunnel, the process of performing UDP tunnel encapsulation by the IMS terminal or the STG is also similar to that illustrated in FIGS. 4-5. The only difference is that in step S508, a UPD protocol header (UDP Header) is added in the header of the encrypted packet (the encryption is not necessarily SSL encryption) to form a UDP packet body.

Figure 7:
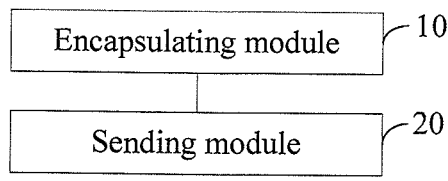
FIG. 7 is a schematic structural diagram of a data transmission apparatus in an IMS according to the first embodiment of the present invention.

FIG. 7 is a schematic structural diagram of a data transmission apparatus in an IMS according to the first embodiment of the present invention. The data transmission apparatus may be an IMS terminal or an STG. As shown in FIG. 7, the apparatus includes: an encapsulating module 10, configured to perform tunnel encapsulation for an RTP packet to obtain a tunnel packet, where the tunnel packet includes a record unit, and a plurality of RTP packets are encapsulated in each record unit; and a sending module 20, configured to send the tunnel packet obtained by the encapsulating module 10 to a peer end over a tunnel connected to the peer end, where the peer end is an STG or an IMS terminal.

In this embodiment of the present invention, considering the characteristic that small packets of the RTP packets may be transmitted periodically, the plurality of RTP packets are encapsulated into a record, that is, the plurality of RTP packets share additional information of one record. In this way, additional information of the plurality of RTP packets during the tunnel encapsulation process is aggregated by sacrificing a little real-time performance. This reduces the additional bandwidth caused by the tunnel encapsulation, further reduces the bandwidth of a single packet, and avoids the problem of the prior art that user experience and service access capabilities are degraded to some extent because higher requirements are imposed on the user access bandwidth due to the higher additional bandwidth of the single packet. Accordingly, the tunnel packet not only satisfies the requirement on real-time performance, but also satisfies the requirement on bandwidth.

In practice, the tunnel may be an SSL tunnel, or an HTTP tunnel, or a UDP tunnel.

Figure 8:
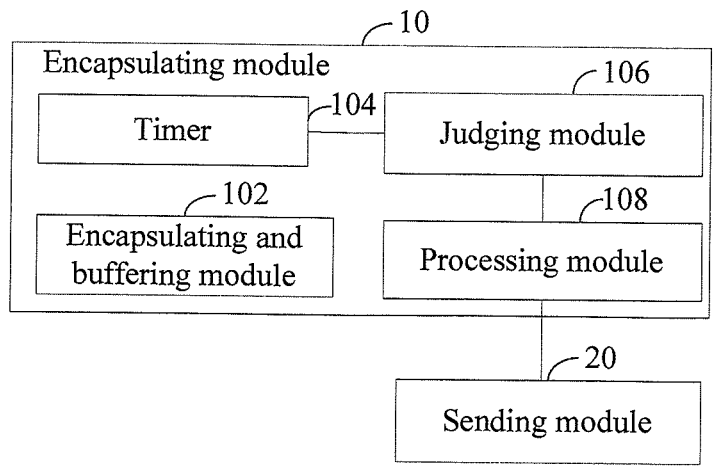
FIG. 8 is a schematic structural diagram of a data transmission apparatus in an IMS according to the second embodiment of the present invention.

As shown in FIG. 8, the encapsulating module 10 includes: an encapsulating and buffering module 102, configured to generate and buffer an RTP packet in a pre-created link table; a timer 104, configured to perform timing; an judging module 106, configured to judge whether a time recorded by the timer 104 reaches a preset encapsulation time interval T, where the value of the preset encapsulation time interval T should be smaller than or equal to 200 ms (within a range allowed by a voice delay of the IMS); a processing module 108, configured to: when the judging module 106 judges that the time recorded by the timer reaches the preset encapsulation time interval, perform tunnel encapsulation for a plurality of RTP packets generated in the link table within the preset encapsulation time interval T to obtain a tunnel packet.

Figure 9:
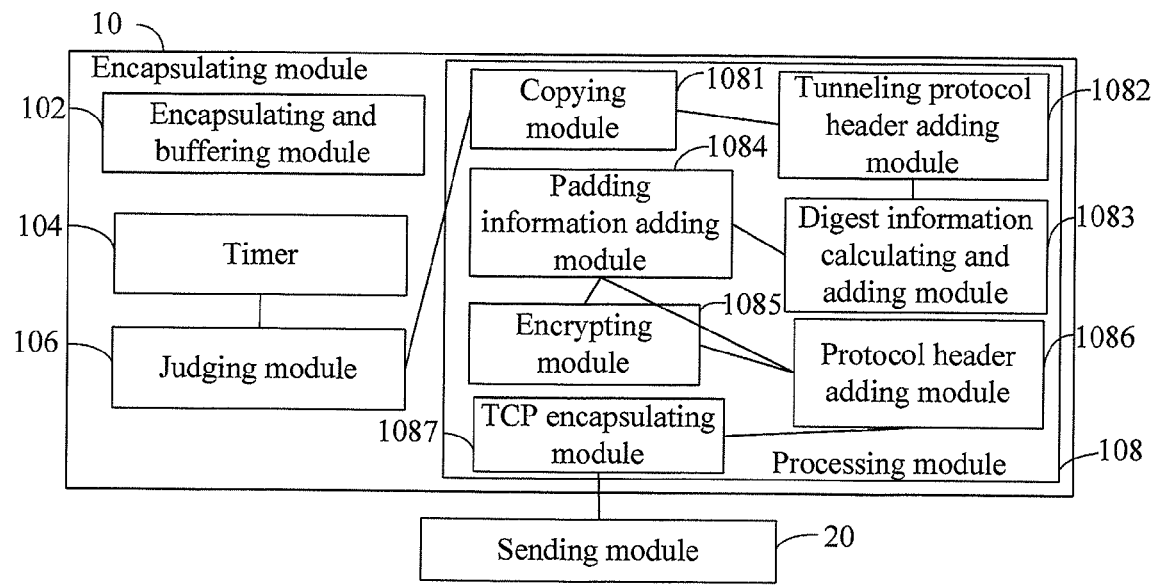
FIG. 9 is a schematic structural diagram of a data transmission apparatus in an IMS according to a third embodiment of the present invention.

As shown in FIG. 9, to perform tunnel encapsulation for a plurality of RTP packets generated in the link table, the processing module 108 may include the following modules:

a copying module 1081, configured to fetch the plurality of RTP packets from the link table, and copy the packets to a section of contiguous memory space;

a tunneling protocol header adding module 1082, configured to add a tunneling protocol header (Enc Header) in the header of the memory space;

a digest information calculating and adding module 1083, configured to perform digest calculation for data in the memory space with the Enc Header added by the tunneling protocol header adding module 1082, and attach the digest information (HMAC) obtained by calculation in the tail of the memory space with the Enc Header added;

a padding information adding module 1084, configured to attach packet length padding information (Tail) behind the HMAC attached by the digest information calculating and adding module 1083;

an encrypting module 1085, configured to: when the tunnel is an SSL tunnel or a UDP tunnel, encrypt data in the memory space with the Tail attached by the padding information adding module 1084;

a protocol header adding module 1086, configured to: when the tunnel is an SSL tunnel, add an SSL protocol header in the header of the memory space encrypted by the encrypting module 1085 to form an SSL record unit; when the tunnel is a UDP tunnel, add a UDP protocol header in the header of the memory space encrypted by the encrypting module 1085 to form a UDP packet body; when the tunnel is an HTTP tunnel, add an HTTP protocol header in the header of the memory space with the Tail added by the padding information adding module 1084 to form an HTTP message body; and a TCP encapsulating module 1087, configured to perform TCP encapsulation for the record unit formed by the protocol header adding module 1086 to obtain a tunnel packet, where the record unit is any one of the following: an SSL record unit, a UDP packet body, and an HTTP message body; that is, when the tunnel is an SSL tunnel, perform TCP encapsulation for the SSL record unit to obtain an SSL tunnel packet; when the tunnel is a UDP tunnel, perform TCP encapsulation for the UDP packet body to obtain a UDP tunnel packet; and when the tunnel is an HTTP tunnel, perform TCP encapsulation for the HTTP message body to obtain an HTTP tunnel packet.

Figure 10:
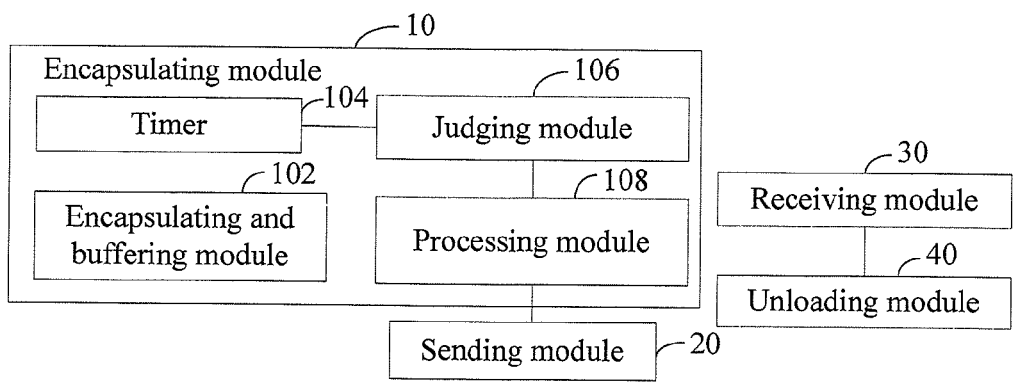
FIG. 10 is a schematic structural diagram of a data transmission apparatus in an IMS according to a fourth embodiment of the present invention.

As shown in FIG. 10, the apparatus may further include: a receiving module 30, configured to receive a tunnel packet sent by the peer end over the tunnel; and an unloading module 40, configured to perform tunnel decapsulation for the tunnel packet received by the receiving module 30 to obtain an RTP packet, where the tunnel packet includes a record unit, and a plurality of RTP packets are encapsulated in each record unit. Obviously, the specific process of performing tunnel decapsulation for the tunnel packet by the unloading module 40 is an inverse process of the process illustrated in FIG. 5, and is not detailed herein.

Figure 11:
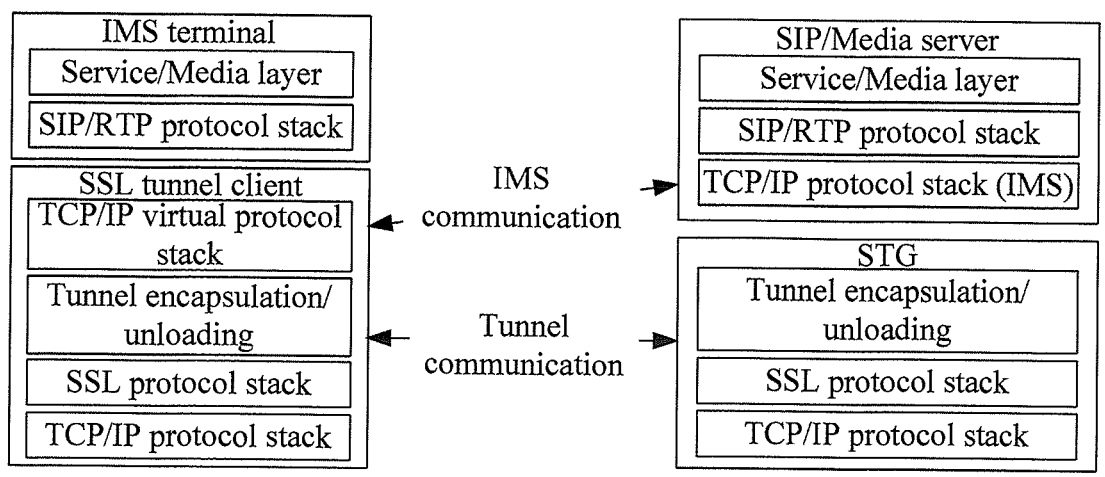
FIG. 11 is a layered schematic structural diagram of an IMS terminal, an STG, and a SIP/media server in an IMS according to a fifth embodiment of the present invention.

In practice, when the tunnel is an SSL tunnel, as shown in FIG. 11, an SSL tunnel client is integrated in the IMS terminal. The IMS terminal establishes an SSL tunnel with an STG by using the SSL tunnel client. The IMS terminal and a SIP/media server are responsible for service/media layer processing and SIP/RTP packet processing. The SIP/media server is provided with a TCP/IP protocol stack, for communicating with a TCP/IP virtual protocol stack of the SSL tunnel client. The SSL tunnel client includes: a TCP/IP virtual protocol stack, a tunnel encapsulating/unloading module, an SSL protocol stack, and a TCP/IP protocol stack module. The STG includes: a tunnel encapsulating/unloading module, an SSL protocol stack, and a TCP/IP protocol stack module. In practice, in an IMS client, a TCP/IP virtual protocol stack, a tunnel encapsulating/unloading module, an SSL protocol stack, and a TCP/IP protocol stack of the SSL tunnel client may be used to implement functions of an encapsulating module 10 and an unloading module 40 as shown in FIG. 10. In an STG, a tunnel encapsulating/unloading module, an SSL protocol stack and a TCP/IP protocol stack may be used to implement functions of an encapsulating module 10 and an unloading module 40 as shown in FIG. 10.

Specifically, in the SSL tunnel client, the TCP/IP virtual protocol stack is configured to construct IP layer information in a SIP/RTP packet (corresponding to step S504 in FIG. 5). The tunnel encapsulating/unloading module is configured to perform tunnel encapsulation and unloading for an RTP packet, and add a tunneling protocol header (Enc Header) in the packet during packet sending, for identifying the tunnel bearing format and type (corresponding to step S506 in FIG. 5); and during packet receiving, identify the tunnel content type and unload the tunneling protocol header to extract the RTP packet. The SSL protocol stack is used for SSL encapsulation, encryption, and data sending and receiving to obtain an SSL record (corresponding to step S508 in FIG. 5). The TCP/IP protocol stack is used to encapsulate and unload the SSL record at a transport layer and a network layer to obtain the SSL tunnel packet (corresponding to step S510 in FIG. 5).

Similarly, functions of the tunnel encapsulating/unloading module, SSL protocol stack, and TCP/IP protocol stack in the STG are respectively the same as those of the tunnel encapsulating/unloading module, SSL protocol stack, and TCP/IP protocol stack in the SSL tunnel client, which are not detailed herein.

When the IMS terminal sends data through the SSL tunnel client to the STG, the specific process is as follows:

Step 1: The TCP/IP protocol stack encapsulates media data that the IMS terminal desires to send into an RTP packet.

Step 2: A timer is set in the tunnel encapsulating/unloading module, the period of the timer (that is, the above preset encapsulation time interval T) is T, and the value of T is set within a range allowed by a voice delay (T≤200 ms, for example, T=100 ms). The tunnel encapsulating/unloading module collects a plurality of RTP packets (the number of RTP packets is T divided by the packetization time of an RTP packet and rounded up) within T. When the timer expires, a tunnel header is encapsulated (for the specific processing, refer to step S506 shown in FIG. 5), and then the packet is output to the SSL protocol stack.

Step 3: The SSL protocol stack continues to perform SSL encryption and encapsulation for the packet, and sends the packet (for the specific processing, refer to step S508 illustrated in FIG. 5). In this way, the plurality of RTP packets in step 2 forms an SSL record. That is, the RTP packets that originally need to be encapsulated into a plurality of SSL records may be encapsulated into only one SSL record.

Step 4: The TCP/IP protocol stack performs TCP encapsulation for the SSL record formed in step 3 to obtain an SSL tunnel packet to be finally sent, and sends the packet to the STG.

The STG performs the following process after receiving the SSL tunnel packet from the IMS terminal:

Step 1: The TCP/IP protocol stack parses the SSL tunnel packet to obtain an SSL record.

Step 2: The SSL protocol stack performs SSL unloading for the SSL record.

Step 3: The tunnel encapsulating/unloading module recovers the RTP packet, and sends the packet to a media server at a short time interval or by using the packetization time of the RTP packet. Specifically, the packet may be sent to the TCP/IP protocol stack in a SIP/media server for decapsulation to obtain the media data therein.

Similarly, the specific process when the STG receives the packet returned by the media server and sends data to the IMS terminal and the specific process when the IMS terminal receives the SSL tunnel packet sent by the STG are the same as the above steps, and are not detailed herein.

The IMS includes the IMS terminal and the STG. The IMS terminal and the STG are apparatuses shown in FIGS. 7-10. The IMS terminal and the STG may use the data transmission method as shown in FIGS. 3-5 to send data to a peer end, and receive and process data sent by the peer end.

As compared with the prior art, according to the embodiments of the present invention, when a tunnel is used to bear the IMS service packet, a plurality of RTP packets are encapsulated in a record so that the borne plurality of RTP packets share the additional information of one record. This greatly saves the additional bandwidth, effectively reduces the single packet bandwidth of the finally transmitted tunnel packet, lowers the requirement on the user access bandwidth, and improves the user experience and service access capabilities to some extent. Using the case where the preset encapsulation time interval is 100 ms as an example, a maximum delay of 80 ms is generated for parts of RTP packets, but the additional bandwidth is reduced by five times.

The additional bandwidth is effectively reduced. Therefore, bandwidth performance for secure traversal of IMS services in a proxy environment (that is, the IMS terminal accesses the Internet by using a proxy server) may be satisfied so that the SSL VPN (Virtual Private Network, virtual private network) solution is more competitive in the IMS secure traversal field.

It should be noted that persons of ordinary skill in the art may understand that all or part of processes in the methods of the above embodiments may be implemented by relevant hardware instructed by a computer program. The program may be stored in a computer readable storage medium and when executed, may include the processes of the embodiments of the above methods. The storage medium may be a magnetic disk, an optical disk, a read-only memory (Read-Only Memory, ROM), a random access memory (Read-Only Memory, RAM), and the like.

Persons of ordinary skill in the art should understand that all or a part of the steps of the methods in the embodiments may be implemented by a program instructing relevant hardware. The program may be stored in a computer readable storage medium, such as a read only memory, a random access memory, a magnetic disk or an optical disk.

The method, apparatus and system for tunnel encapsulation for secure traversal of IMS services in the embodiments of the present invention are described in detail above. In this specification, specific examples are used to describe the principles and implementation of the present invention. The above descriptions of the embodiments are only used to help understand the method and core idea of the present invention. Persons of ordinary skill in the art may make modifications to the specific implementation manners and application scopes without departing from the idea of the present invention. Therefore, the content of the specification should not be construed as a limitation to the present invention.

What is claimed is:

1. A data transmission method, which is used in an Internet Protocol Multimedia Subsystem (IMS), comprising:
    performing, by a first device, tunnel encapsulation for a plurality of Real-time Transport Protocol (RTP) packets to obtain a first tunnel packet, wherein the first tunnel packet comprises a record unit and a single tunneling protocol header, and the plurality of RTP packets are encapsulated in the record unit, the single tunneling protocol header associated with all of the RTP packets encapsulated in the record unit; and
    sending, by the first device, the first tunnel packet to a second device over a Secure Sockets Layer (SSL) tunnel connected to the second device, wherein when the first device is an IMS terminal, the second device is a Security Tunnel Gateway (STG), and when the first device is a STG, the second device is an IMS terminal;
    wherein performing the tunnel encapsulation for the RTP packets to obtain the first tunnel packet comprises:
        generating and buffering, by the first device, the RTP packets in a pre-created link table;
        fetching, by the first device, the RTP packets from the link table, and copying the packets to a section of contiguous memory space;
        adding, by the first device, the tunneling protocol header in a header of the memory space;
        performing, by the first device, digest calculation for data in the memory space with the tunneling protocol header added, and attaching the digest information obtained by calculation in a tail of the memory space with the tunneling protocol header added;
        attaching, by the first device, packet length padding information behind the digest information;
        encrypting, by the first device, data in the memory space with the padding information attached;
        adding, by the first device, an SSL protocol header in the header of the encrypted memory space to form an SSL record unit;
        determining, by the first device, whether a preset encapsulation time interval is reached, wherein the preset encapsulation time interval is an integral multiple of a packetization time of a media coding type in the first device for generating the RTP packets; and
        if the preset encapsulation time interval is reached, performing, by the first device, Transfer Control Protocol (TCP) encapsulation for the formed SSL record unit within the preset encapsulation time interval to obtain the first tunnel packet.

2. The method according to claim 1, wherein the preset encapsulation time interval is smaller than or equal to 200 ms.

3. The method according to claim 1, further comprising:
    receiving, by the first device, a second tunnel packet sent by the second device over the tunnel; and
    performing, by the first device, tunnel decapsulation for the received tunnel packet to obtain an RTP packet, wherein the second tunnel packet comprises a record unit, and a plurality of RTP packets are encapsulated in each record unit.

4. A data transmission apparatus, which is used in an Internet Protocol Multimedia Subsystem (IMS), the apparatus comprising:
    an encapsulating module, configured to perform tunnel encapsulation for a plurality of Real-time Transport Protocol (RTP) packets to obtain a first tunnel packet, wherein the first tunnel packet comprises a record unit and a single tunneling protocol header, and the plurality of RTP packets are encapsulated in the record unit, the single tunneling protocol header associated with all of the RTP packets encapsulated in the record unit; and
    a sending module, configured to send the first tunnel packet to a peer end over a Secure Sockets Layer (SSL) tunnel connected to the peer end, wherein when the data transmission apparatus is an IMS terminal, the peer end is a Security Tunnel Gateway (STG), and when the data transmission apparatus is a STG, the per end is an IMS terminal;
    wherein to perform the tunnel encapsulation, the encapsulating module is configured to:
        generate and buffer the RTP packets in a pre-created link table;
        fetch the RTP packets from the link table, and copy the packets to a section of contiguous memory space;
        add the tunneling protocol header in a header of the memory space;
        perform digest calculation for data in the memory space with the tunneling protocol header added, and attach the digest information obtained by calculation in a tail of the memory space with the tunneling protocol header added;
        attach packet length padding information behind the digest information;
        encrypt data in the memory space with the padding information attached;
        add an SSL protocol header in the header of the encrypted memory space to form an SSL record unit;
        determine whether a preset encapsulation time interval is reached, wherein the preset encapsulation time interval is an integral multiple of a packetization time of a media coding type for generating the RTP packets; and
        if the preset time interval is reached, perform Transfer Control Protocol (TCP) encapsulation for the formed SSL record unit within the preset encapsulation time interval to obtain the first tunnel packet.

5. The apparatus according to claim 4, wherein the preset encapsulation time interval is smaller than or equal to 200 ms.

6. The apparatus according to claim 4, further comprising:
a receiving module, configured to receive a second tunnel packet sent by the peer end over the tunnel; and
an unloading module, configured to perform tunnel decapsulation for the second tunnel packet received by the receiving module to obtain an RTP packet, wherein the second tunnel packet comprises a record unit, and a plurality of RTP packets are encapsulated in each record unit.

7. A non-transitory computer-readable storage medium comprising instructions that, which when executed by a processor in a first device, cause the first device to perform operations comprising:
performing tunnel encapsulation for a plurality of Real-time Transport Protocol (RTP) packets to obtain a first tunnel packet, wherein the first tunnel packet comprises a record unit and a single tunneling protocol header, and the plurality of RTP packets are encapsulated in the record unit, the single tunneling protocol header associated with all of the RTP packets encapsulated in the record unit; and
sending the first tunnel packet to a second device over a Secure Sockets Layer (SSL) tunnel connected to the second device, wherein when the first device is an Internet Protocol Multimedia Subsystem (IMS) terminal, the second device is a Security Tunnel Gateway (STG), and when the first device is a STG, the second device is an IMS terminal;
wherein performing the tunnel encapsulation for the RTP packets to obtain the first tunnel packet comprises:
generating and buffering the RTP packets in a pre-created link table;
fetching the RTP packets from the link table, and copying the packets to a section of contiguous memory space;
adding the tunneling protocol header in a header of the memory space;
performing digest calculation for data in the memory space with the tunneling protocol header added, and attaching the digest information obtained by calculation in a tail of the memory space with the tunneling protocol header added;
attaching packet length padding information behind the digest information;
encrypting data in the memory space with the padding information attached;
adding an SSL protocol header in the header of the encrypted memory space to form an SSL record unit;
determining whether a preset encapsulation time interval is reached, wherein the preset encapsulation time interval is an integral multiple of a packetization time of a media coding type in the first device for generating the RTP packets; and
if the preset encapsulation time interval is reached, performing Transfer Control Protocol (TCP) encapsulation for the formed SSL record unit within the preset encapsulation time interval to obtain the first tunnel packet.

8. The non-transitory machine-readable medium according to claim 7, wherein the preset encapsulation time interval is smaller than or equal to 200 ms.

9. The non-transitory machine-readable medium according to claim 7, wherein the operations further comprise:
receiving a second tunnel packet sent by the second device over the tunnel; and
performing tunnel decapsulation for the received tunnel packet to obtain an RTP packet, wherein the second tunnel packet comprises a record unit, and a plurality of RTP packets are encapsulated in each record unit.

\* \* \* \* \*